(12) United States Patent
Lowell et al.

(10) Patent No.: US 9,182,303 B2
(45) Date of Patent: Nov. 10, 2015

(54) STRAIN SENSOR, MANUFACTURING METHOD AND SYSTEM

(71) Applicant: DRAKA HOLDING N.V., Amsterdam (NL)

(72) Inventors: Mark Edmund Lowell, Amsterdam (NL); Tyler Louis Angers, Amsterdam (NL); Jan Wigger Jonker, Amsterdam (NL); Kendall Waterman, Amsterdam (NL)

(73) Assignee: Draka Holding N.V., Amsterdam (NL)

( * ) Notice: Subject to any disclaimer, the term of this patent is extended or adjusted under 35 U.S.C. 154(b) by 251 days.

(21) Appl. No.: 13/763,683

(22) Filed: Feb. 10, 2013

(65) Prior Publication Data

US 2013/0209024 A1 Aug. 15, 2013

(30) Foreign Application Priority Data

Feb. 10, 2012 (NL) .................................. 2008275

(51) Int. Cl.
*G02B 6/00* (2006.01)
*G01L 1/24* (2006.01)

(52) U.S. Cl.
CPC ................ *G01L 1/242* (2013.01); *G01L 1/243* (2013.01)

(58) Field of Classification Search
None
See application file for complete search history.

(56) References Cited

U.S. PATENT DOCUMENTS

| | | | |
|---|---|---|---|
| 4,962,996 A * | 10/1990 | Cuellar et al. | 385/128 |
| 5,170,459 A * | 12/1992 | Norton et al. | 385/128 |
| 5,181,268 A * | 1/1993 | Chien | 385/128 |
| 5,321,257 A * | 6/1994 | Danisch | 250/227.16 |
| 5,408,564 A * | 4/1995 | Mills | 385/128 |
| 5,724,466 A * | 3/1998 | Rickenbach et al. | 385/60 |
| 5,732,175 A * | 3/1998 | Fan | 385/87 |
| 5,838,862 A * | 11/1998 | Chien | 385/102 |
| 5,907,650 A * | 5/1999 | Sherman et al. | 385/80 |
| 5,976,285 A | 11/1999 | McKee | |
| 6,208,790 B1 * | 3/2001 | Zopf et al. | 385/128 |
| 6,322,256 B1 * | 11/2001 | Inada et al. | 385/84 |
| 6,453,097 B1 * | 9/2002 | Newton et al. | 385/102 |
| 8,355,613 B2 * | 1/2013 | Weimann | 385/100 |
| 2002/0191928 A1 | 12/2002 | Carter et al. | |
| 2006/0153508 A1 | 7/2006 | Bowker et al. | |
| 2008/0205840 A1 * | 8/2008 | Wakabayashi et al. | 385/128 |
| 2008/0273852 A1 | 11/2008 | Parker et al. | |

(Continued)

FOREIGN PATENT DOCUMENTS

| DE | 102009024885 | 12/2010 |
|---|---|---|
| WO | 2004066000 | 8/2004 |
| WO | 2009022095 | 2/2009 |

*Primary Examiner* — Tina Wong
(74) *Attorney, Agent, or Firm* — Patterson Intellectual Property Law, P.C.; James R. Cartiglia; Tiffany N. Palmer

(57) ABSTRACT

Strain sensor, including an elongated protective encasing (5) surrounding an inner space, and an optical fiber (3) extending through the encasing (5), the fiber (3) at least including a fiber core (3a) and a fiber cladding (3b), wherein a cured filler material fills (4) at least part of a space between the fiber (3) and the protective encasing (5), the cured filler material (4) being configured for allowing strain coupling between the protective encasing (5) and the fiber (3), wherein an outer diameter of the fiber (3) is at least about 250 μm, and wherein the cured filler material (4) is one or more of: a flexible material, a resilient material, and a material having a shore A hardness that is lower than about 50. The invention also provides a method and system for manufacturing a strain sensor.

24 Claims, 2 Drawing Sheets

(56) References Cited

U.S. PATENT DOCUMENTS

Figure 1:
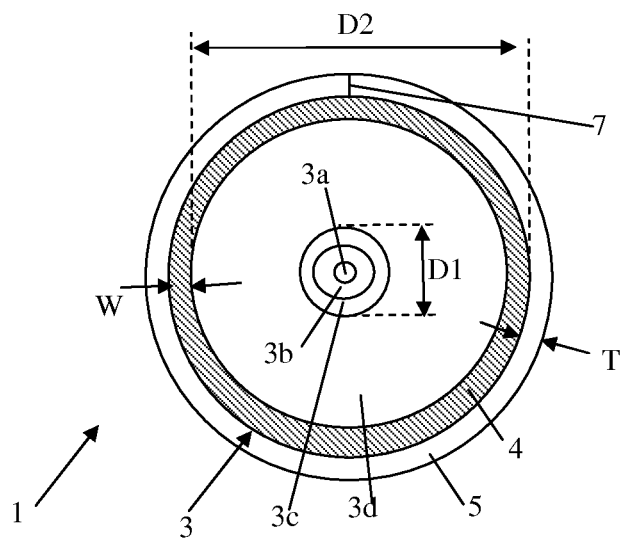

| | | | |
|---|---|---|---|
| 2009/0034903 A1* | 2/2009 | Herbst | 385/13 |
| 2011/0176776 A1* | 7/2011 | Imamura | 385/59 |
| 2012/0082422 A1* | 4/2012 | Sarchi et al. | 385/101 |
| 2012/0125596 A1* | 5/2012 | Homa et al. | 166/66 |
| 2013/0154632 A1* | 6/2013 | McEwen-King et al. | 324/244.1 |

* cited by examiner

STRAIN SENSOR, MANUFACTURING METHOD AND SYSTEM

The invention relates to a strain sensor, including an elongated protective encasing surrounding an inner space, and an optical fiber extending through the encasing, the fiber at least including a fiber core, a fiber cladding and a fiber coating, wherein a cured filler material fills at least part of a space between the fiber and the protective encasing, the cured filler material being configured for allowing strain coupling between the protective encasing and the fiber.

Known fiber sensors include glass fiber cores for transmitting light, a cladding and e.g. a metal coating. During operation, light (e.g. laser light) can be transmitted into the sensor fiber, wherein at least part of the light can be backscattered in the fiber (e.g. via Brillouin scattering). The frequency of the backscattered light may depend on several factors, e.g. strain, pressure and/or temperature. The backscattered light can be detected and processed to provide information concerning those factors.

Generally, the core of the fiber is the light-guiding central portion of the optical fiber. The cladding of the fiber is the material that surrounds the core of the optical fiber, the cladding having a lower index of refraction compared to that of the core. Generally, both the core and the cladding are transparent to the light that is to be transmitted through the fiber. Also, generally, the fiber is provided with a protective coating, which may include one or more layers of various materials.

WO2004066000 discloses an optical fiber having a core and a cladding, and a coating or buffer. According to WO2004066000, the coating or buffer can be a flexible protective nickel or stainless steel tubing encasing the optical fiber.

US2008/0273852 discloses an optical fiber having a core, a cladding, and a metal protective coating on the cladding to protect the surface of the cladding. According to US'852, the diameter of the cladding is usefully in the range 180 μm to 250μ.

WO 2009/022095 discloses a method of installing a cable for the distributed measurement of a physical parameter, including providing a cable adapted to measure a physical parameter at a plurality of points along the carrier tube, inserting the cable through a carrier tube, injecting a hardenable fluid into the carrier tube, and hardening the hardenable fluid material to be in a solid state. The hardened material allows strain coupling between the cable and the carrier tube, for example for Brillouin OTDR (distributed) or Michelson interferometer (integrating) measurement applications. During installation, the hardenable fluid is injected into the carrier tube, dragging the optical fiber into the tube. This cable and respective installation method have several disadvantages. Firstly, they require using certain chemical substances in the field, leading to potential spilling/leakage in the field and resulting environmental accidents. Also, only a limited installation length can be achieved by the known method due to a maximum achievable floating distance. Besides, the known method requires a pipe having a relatively large diameter.

The present invention aims to provide an improved sensor system and method. Particularly, the invention aims to provide a relatively long, durable, sturdy and reliable optical fiber strain sensor. Also, particularly, the invention aims to provide a strain sensor that is able to provide relatively accurate and reproducible measurement results. Besides, the invention aims to provide improved manufacturability of relatively long (e.g. at least 1 km in length) strain sensors.

To this aim, according to an aspect of the invention, there is provided a fiber sensor as defined by the features of claim 1.

A outer diameter of the fiber is relatively large, particularly at least about 250 μm. Also, the cured filler material is selected from the group consisting of: a flexible material, a resilient material, a material having a shore A hardness that is lower than about 50, and a material satisfying any combination of said conditions (e.g. a resilient and/or flexible cured material having a shore A hardness that is lower than about 50).

It has been found that a relatively flexible and/or relatively soft (i.e. with a low shore A harness) and/or resilient material can be used as a strain coupling filler material in the strain sensor. Particularly, it has been found that such a filler material can provide a strain coupling between the relatively large diameter fiber and the encasing, that is sufficient to carry out strain measurements.

It is noted that in this application, the Shore A standard according to the ASTM D2240 standard is referred to, as will be appreciated by the skilled person.

Also, it has been found such a filler material may be used to manufacture a strain sensor with a just a very small distance between an outer surface of the fiber and an opposite inner surface of the encasing, leading to improved measurement results. In the latter case, for example, the relatively soft and/or resilient filler material can prevent or reduce chances that the fiber locally locks-in in the encasing, both during and after manufacturing, providing improved sensor reliability and improved sensor durability.

Particularly, during manufacturing, a curable, relatively fluid filler material may be applied, allowing local fiber movement with respect to the encasing after the fiber has been enclosed in the encasing, thereby preventing or reducing stress on the fiber during one or more subsequent manufacturing steps. Also, such a curable, relatively fluid filler material can compensate for possible diameter variations of the fiber and/or encasing during the manufacturing of the strain sensor.

Besides, the present strain sensor can be made relatively compact, with an external protective encasing of relatively small diameter, e.g. a diameter of about 1 cm or smaller, for example about 5 mm or smaller, particularly a diameter in the range of about 1-2 mm, or smaller than 1 mm.

The cured filler material may be configured to hold the fiber at a distance from the protective encasing, for example by completely encapsulating the fiber. This is not essential: the fiber may also directly contact the protective encasing locally at one or more locations.

In a further embodiment, the fiber may extend substantially in parallel with a centre line of the protective encasing, for example coaxially along that centre line. The fiber does not have to extend entirely in parallel with a centre line of the protective encasing. For example, the fiber may extend with one or more slight bends or in a wave-like shape with respect to a centre line of the encasing. As a result, fiber strain during manufacturing can be reduced, and a relatively consistent strain sensor product can be achieved. For example, the fiber may have a certain overlength (i.e. an excess length) with respect to the encasing, for example an overlength larger than 0% and smaller than 0.1%, such as about 0.05% overlength.

Also, the cured filler material may completely fill a space between an external surface of the fiber and an opposite internal surface of the protective encasing. Alternatively, the cured filler material may fill only part of a space between an external surface of the fiber and an opposite internal surface of the protective encasing, for example at certain predetermined strain coupling locations, spaced-apart from one another viewed in a longitudinal direction of the resulting strain sensor.

According to a further embodiment, the cured filler material has a shore A hardness in the range of about 5 to 40, for example a shore A hardness in the range of between 10 and 30.

The cured filler material may for example be selected from the group consisting of: a polymer or polymeric material, a rubber or rubberlike material, a silicone, a thermoplastic material, and a cured gel. Good results have e.g. been obtained with a silicon rubber, particularly a Dow-Corning™ green silicon rubber 2-part compound injected-like gel. The skilled person will appreciated that the invention is not limited to these substances as a curable/cured filler material of the strain sensor.

The fiber cladding may be e.g. a conventional cladding, for example made of glass. Typically, an outer diameter of the cladding may be in the range of about 125 mµ to about 150 mµ.

The fiber coating as such (which may also be referred to as a "primary fiber buffer") may be configured in various ways. The fiber coating may be a single or dual layer coating, for example made of one or more radiation cured acrylate materials.

In a further embodiment, the fiber coating is a single layer radiation curable high temperature acrylate coating (preferably able to withstand temperatures of 150° C.). Alternatively the coating can be polyimide coating.

In a further embodiment, an external diameter of the fiber coating can be about 250 µ.

Also, in a further embodiment, the fiber coating may have a layer thickness in the range of about 15 to 200 µm, for example a range of about 60-70 µm. Alternatively, the fiber coating as such can be or include a relatively thin coating, for example having a coating thickness or a few tenths of µm up to few µm (e.g. a coating with a thickness in the range of 1 to 15 µm), for example a coating including or consisting of a metal layer or carbon layer.

In a further embodiment, the fiber is an up-buffered fiber, being provided with one or more buffer layers (tightly surrounding the fiber coating). Such a buffer layer may be called "secondary buffer" in case said fiber coating is called "primary buffer".

In a further embodiment, an outer diameter of the fiber or up-buffered fiber is relatively large, and may for example be at least 300 µm, for example at least 500 µm, particularly at least 750 µm, for example about 900 µm. A maximum outer diameter of the fiber or up-buffered fiber as such may e.g. be 1 mm, but that is not essential.

As follows from the above, preferably, the fiber may be provided with one or more buffer layers (surrounding the fiber coating) to achieve a said large outer fiber diameter, so that the relatively large diameter fiber can include a fiber coating of conventional diameter (e.g. 250 µm), and for example a cladding of conventional diameter (e.g. 125 µm). Each said buffer layer may be integral part of the fiber. The buffer layer as such is not directly involved with guiding the light through the fiber. The same holds for the coating.

For example, the fiber may include at least one buffer layer extending around the cladding and the coating, the at least one buffer layer providing said relatively large outer diameter of the fiber. Each buffer layer may tightly surround and firmly connect to the adjoining fiber layer located therein.

The at least one buffer layer (extending around the fiber coating) may include various materials. One or more of the buffer layers, for example each buffer layer, may for example include or consist of a plastic, an acrylate, a thermoplastic, polyvinylchloride (PVC), Hytrel™, nylon, and/or one or more other materials, as will be appreciated by the skilled person. It has been found that good results can be obtained using one or more acrylate buffer layers (for example at least two acrylate buffer layers).

The fiber may be a single-mode fiber or a multi-mode fiber. Generally, a diameter of the light guiding core of the fiber may be relatively small, e.g. in the range of about 7-100 µm or another diameter, for example but not limited to about 25 to 75 µm, for example about 40 to 70 µm, as will be appreciated by the skilled person. For example, the core diameter may be about 7-8 mµ for a single mode fiber, or between 10 and 100 mµ for a multimode fiber.

In a further embodiment, a maximum transversal distance between an inner side of the protective encasing and an outer side of the fiber is relatively small, for example 500 µm, and preferably 300 µm.

A maximum transversal distance between an inner side of the protective encasing and an outer side of the fiber may for example be in the range of 40 µm to 200 µm, for example in the range of 50 µm to 175 µm, particularly a range of about 75 µm-150 µm.

In a further embodiment, a minimum transversal distance between an inner side of the protective encasing and an outer side of the fiber may be 10 µm, particularly 20 µm. Alternatively, in case of the fiber locally contacting the encasing, the minimum transversal distance between the inner side of the protective encasing and the outer side of the fiber may be 0 µm.

The protective encasing may have various shapes, viewed, in a transversal cross-section, for example circular, oval, elliptical, polygonal, or differently. An inner side of the protective encasing may e.g. have a substantially circular cross-section, in case of a cylindrical tubular protective encasing, or a different shape. In an embodiment, said filler material may be located in a substantially annular intermediate space between the inner side of the encasing and the fiber.

The protective encasing may be made of, or substantially consists of, at least one metal or an alloy, for example steel, or another material.

Preferably, the strain sensor is flexible, e.g. allowing winding and unwinding the sensor onto, respectively from a carrier. For example, the protective encasing may be flexible (for example flexible under its own weight, and/or manually flexible). The fiber of the strain sensor is preferably a flexible fiber. Also, preferably, the said curable filler material is flexible after being cured.

In a further embodiment, the protective encasing has a wall thickness that is smaller than about 0.5 mm, for example a thickness in the range of about 0.1-0.3 mm.

Also, the strain sensor may have various lengths, for example having a minimum length of 10 m, 100 m, 1000 m, or another minimum length. A maximum length of the strain sensor may e.g. be 5 km, of a different maximum length.

The invention also relates to a method for manufacturing a strain sensor, for example a strain sensor according to the invention.

It has been found that an improved manufacturing method includes: providing an optical fiber, at least including a fiber core and a fiber cladding; providing a preform, for example an elongated strip, to be formed into a tubular protective encasing; feeding the optical fiber to the preform before and/or during the forming of the tubular encasing, to be enclosed in the encasing; providing a curable filler material between the fiber and an inner side of the encasing, and curing the curable filler material; wherein the cured filler material allows strain coupling between the protective encasing and the fiber by connecting the fiber's and encasing's opposite surfaces to one-another.

In this way, a durable, reliable, and relatively long (e.g. at least 100 m, preferably at least 1 km) strain sensor can be manufactured.

In a further embodiment, the forming of the tubular encasing and the feeding of the optical fiber to the preform are carried out in a continuous process.

The curable filler material may be applied to the preform before forming the encasing, and/or during the forming of the encasing, and/or to the tubular encasing after the encasing has been formed.

The tubular encasing may be longitudinally sealed using a welding process, e.g. using a laser to form a longitudinal leak tight weld.

In an embodiment, the fiber may be positioned in the protective encasing with one or more bends or in a wave-like shape, particularly before the curable filler material has been cured.

In an embodiment, the fiber may be positioned in the protective encasing substantially in parallel with a centre line of the encasing before the curable filler material has been cured.

At least a section of the tubular encasing may be deformed after having received the fiber, and preferably before curing of the curable filler material in that section, for example in a drawing process for attaining a desired final diameter/length and/or a cold conversion for strength increase.

Also, for example, the curable filler material may allow some lateral and/or longitudinal fiber repositioning within the encasing during optional subsequent manufacturing steps, such as deforming or stretching the encasing, and/or during optional coiling of the sensor (e.g. winding/spooling the sensor into a sensor carrier, for example a shipping reel).

Said fiber repositioning may be e.g. be a lateral fiber repositioning during an optional reduction of a lateral size (e.g. diameter) of the encasing from an intermediate lateral size final lateral size. The size reduction may particularly close any voids that may still be present within the encasing (i.e. between the encasing's inner surface on one hand and the filler material and the fiber on the other hand).

Also, said fiber repositioning may be longitudinal fiber repositioning, for example in case of a encasing drawing process wherein the length of the encasing is increased (the drawing process may coincide with a diameter reduction process).

The method may also include coiling at least a section of the formed tubular encasing, for example after having received the optical fiber, and for example before the curable filler material has been fully cured. Thus, a relatively long strain sensor can be stored and transported in a relatively compact condition. A said fiber repositioning may e.g. also take place during the coiling of the encasing.

Also, in a further embodiment of the method, an outer diameter of the fiber may be at least about 250 μm, wherein the cured filler material may be one or more of: a flexible material, a resilient material, and a material having a shore A hardness that is lower than about 50. Thus, above-mentioned advantages can be obtained.

An aspect of the invention also provides a manufacturing system for carrying out the method.

The system includes at least: a fiber supplier for providing the optical fiber; a preform supplier for supplying the preform; a filler material supplier for supplying the filler material; and an encasing former configured to form the encasing from the respective preform.

The system may further include a station located downstream of the encasing former for stretching the formed encasing. The system may be configured to supply the fiber with a first speed to the encasing former, wherein the system is configured to supply the perform with a second speed to encasing former, wherein the first speed is higher than the second speed.

Figure 2:
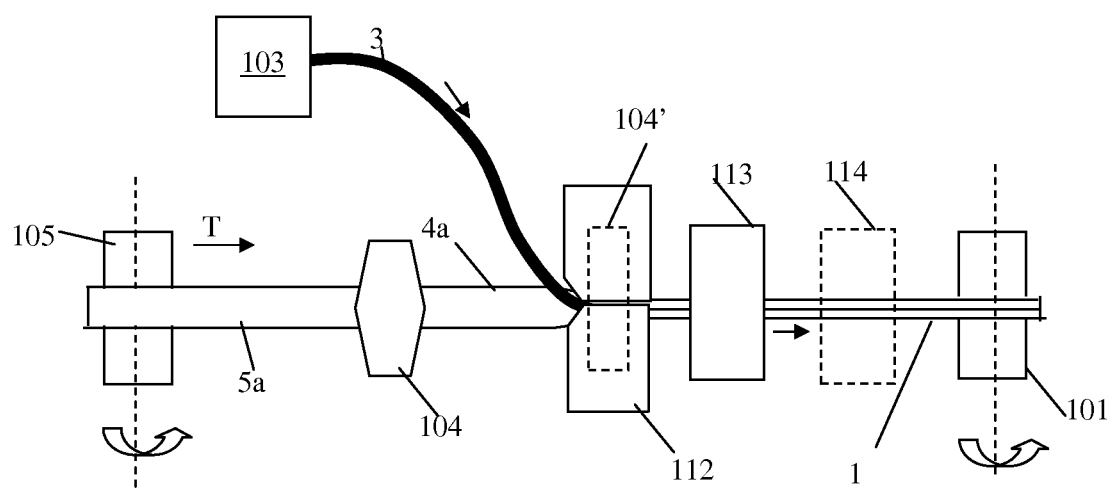
Figure 3:
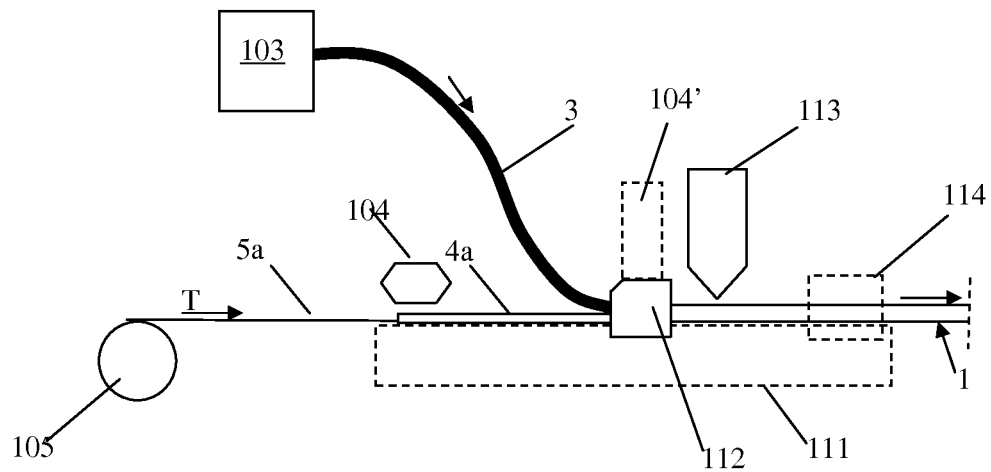
Figure 4A:
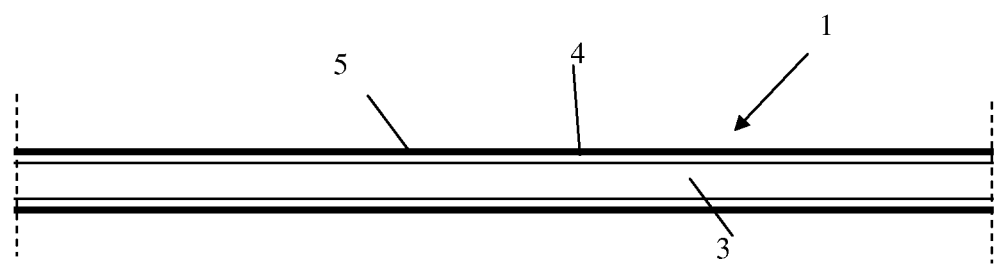
Figure 4B:
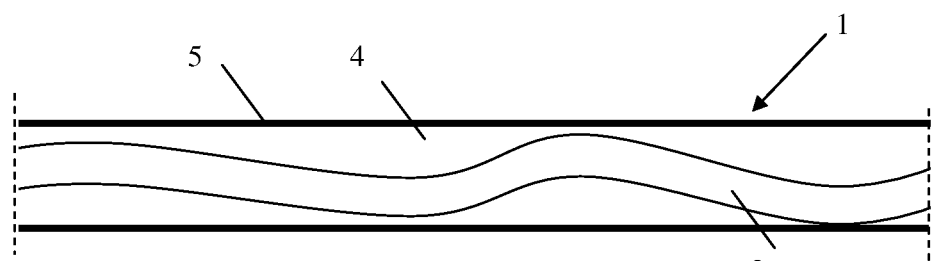

The invention will now be further elucidated by means of, non-limiting, examples referring to the drawing, in which:

FIG. 1 schematically shows a non-limiting example of a cross-section of a sensor according to an embodiment of the invention;

FIG. 2 schematically shows a plan view of a manufacturing method and system according to an embodiment of the invention;

FIG. 3 schematically shows a side view of the manufacturing method and system;

FIG. 4A schematically shows a longitudinal cross-section of a section of a strain sensor, with one fiber positioning configuration; and FIG. 4B schematically shows a longitudinal cross-section of a section of the strain sensor, including a second fiber positioning configuration.

Similar or corresponding features are denoted by similar or corresponding reference signs in this application.

FIG. 1 depicts a non-limiting embodiment of an elongated strain sensor, in a transversal cross-section. The strain sensor includes an elongated protective encasing 5 surrounding an inner space, and an optical fiber 3 extending through the encasing 5. The fiber 3 at least includes a fiber core $3a$ and a fiber cladding $3b$. A cured filler material fills 4 at least part of a space between the fiber 3 and the protective encasing 5. The cured filler material 4 is configured for allowing strain coupling between the protective encasing 5 and the fiber 3. Particularly, to this aim, the filler material 4 mechanically connects an outer surface of the fiber 3 to an opposite inner surface of the encasing 5. Also, to this aim, the filler material 4 may adhere to both surfaces.

In this example, the encasing is a tubular encasing 5, and has a circular cross-section. As is mentioned before, the encasing 5 can also have other configurations, for example having a different cross-sectional shape, as will be clear to the skilled person. In a further embodiment, the encasing 5 is a welded tube, including a longitudinal weld line 7.

The fiber as such can have various configurations, as has been mentioned before. In the present example, the optical fiber 3 includes a central core $3a$, and a cladding $3b$ surrounding the core $3a$ (viewed in a cross-section). One or more protective layers $3c$, $3d$ may be provided, surrounding the cladding $3b$ (viewed in a cross-section). The present non-limiting example includes a coating layer $3c$ that encapsulates the cladding $3b$, particularly concentrically. In the example, the coating layer has an external diameter D1, as is indicated with a double arrow in FIG. 1. Also, a buffer layer $3d$ is provided on the coating layer, thereby providing an up-buffered fiber with increased outer diameter D2 compared to the outer diameter D1 of the coating layer, said increased outer diameter providing the external diameter of the resulting optical fiber 3. It should be observed that the fiber 3 as such can also include one or more other layers and coatings, as will be appreciated by the skilled person. Besides, in an alternative embodiment, the fiber 3 may not include a said buffer layer $3d$.

As is mentioned before, the fiber coating $3c$ can be configured in various ways. For example, the layer $3c$ may be a single or dual layer coating, for example made of one or more radiation cured acrylate materials. In a further embodiment, the fiber coating 3c is a single layer radiation curable high temperature acrylate coating (preferably able to withstand temperatures of 150° C.). Alternatively the coating 3c can be polyimide coating, or a different type of coating. In a further embodiment, an external diameter of the fiber coating 3c is a conventional diameter, e.g. about 250 µ.

As is mentioned before, a said buffer layer 3d can be made of various materials. The buffer layer(s) 3d may for example include or consist of a plastic, an acrylate, a thermoplastic, polyvinylchloride (PVC), Hytrel™, nylon, and/or one or more other materials, as will be appreciated by the skilled person.

Particularly, each coating and buffer layer 3c, 3d may be configured to firmly adhere to adjoining fiber part 3b, 3c that is located therein, allowing strain transfer between the layers to the fiber core 3a.

The relatively large outer diameter D2 of the (up-buffered) fiber 3 as such may be at least 250 µm. In a further embodiment, the outer diameter D2 of the fiber is at least 300 µm, for example at least 500 µm, particularly at least 750 µm, for example about 900 µm. A maximum outer diameter D2 of the fiber 3 may e.g. be 1 mm, but the invention is not limited thereto.

The cured filler material 4 is at least one of, and preferably a combination of: a flexible material, a resilient material, a material having a shore A hardness that is lower than about 50. Good results have been achieved using a material being both flexible and resilient, and having said shore A hardness that is lower than about 50.

The cured filler material 4 may have a shore A hardness in the range of about 5 to 40. In a further embodiment, the cured filler material may have a shore A hardness in the range of between 10 and 30.

The cured filler material 4 may be selected from the group consisting of: a polymer or polymeric material, a rubber or rubberlike material, a silicone, a thermoplastic material, and a cured gel.

In the cross-sections of FIG. 1 and FIGS. 4A, 4B, the cured filler material 4 entirely surrounds the fiber 3. Also, in this cross-section, the fiber 3 is located substantially centrally within the protective encasing 5. For example, the fiber 3 may extend in parallel with a longitudinal centre line of the protective encasing 5, for example coaxially along that centre line. Alternatively, at least part of the fiber does not extend in parallel with a longitudinal centre line of the encasing 5. For example, the fiber 3 may extend with one or more slight bends or in a wave-like shape with respect to a longitudinal centre line of the encasing 5. The fiber 3 can also be positioned differently within the encasing 5, as is mentioned before.

The cured filler material 4 may entirely fill the space between the fiber 3 and an inner surface of the encasing 5, or only part of that space, for example at predetermined sections viewed in a longitudinal direction of the sensor 1. The space that is filled up by the cured filler material 4 may be substantially annular, viewed in cross-section (as in FIG. 1), but that is not essential.

For example, an inner side of the protective encasing 5 may have a substantially circular transversal cross-section (as in FIG. 1), or a different shape.

The encasing 5 may be made of, or may substantially consists of, at least one metal or an alloy, for example steel, or one or more other materials. Preferably, the encasing 5 as such is flexible. The encasing 5 as such may for example be flexible such that it can to be coiled at a winding diameter of 1 m or smaller, without damage, breakage or rupture thereof.

Similarly, the fiber 3 as such may be flexible. The fiber 3 as such may for example be flexible such that it can to be coiled at a winding diameter of 1 m or smaller, without damage, breakage or rupture of any of its components 3a, 3b, 3c, 3d.

Similarly, the cured filler material 4 as such may be flexible. The filler material 4 as such may for example be flexible such that it can to be coiled at a winding diameter of 1 m or smaller, without damage, breakage or rupture of that material 4.

Thus, in a further embodiment, also, the resulting elongated strain sensor 1 can be flexible, for example flexible such that the sensor 1 can to be coiled at a winding diameter of 1 m or smaller, for example a winding diameter of 0.5 m, without damage, breakage or rupture of any of its components 3, 4, 5.

In a further example, a maximum transversal distance W between an inner side of the protective encasing and an outer side of the fiber 3 is relatively small for example 500 µm, or for example 300 µm.

Also, in a further example, a maximum transversal distance W between an inner side of the protective encasing and an outer side of the fiber 3 may be in the range of 40 µm to 200 µm, for example in the range of 50 µm to 175 µm, particularly a range of about 75 µm-150 µm.

In a further embodiment, a minimum transversal distance W between an inner side of the protective encasing and an outer side of the fiber 3 may be 0 µm, for example about 10 µm, particularly about 20 µm.

In a further embodiment, a ratio W:D2 between a transversal distance W between an inner side of the protective encasing and an outer side of the fiber 3 on one hand and the outer diameter D2 of the fiber 3 on the other hand, may about 1:5 or smaller, for example 1:8 or smaller, for example a ratio in the range of 1:5-1:1000, for example a range of 1:8-1:20.

Further, according to an embodiment, the protective encasing as such may have a wall thickness T that is smaller than about 0.5 mm, for example a thickness T in the range of about 0.1-0.3 mm, the encasing 5 preferably being a flexible encasing 5.

It has been found that the resulting strain sensor 1, having a fiber 3 with a relatively large outer diameter and a said filler material 4 for providing strain coupling with the encasing 4, can be made relatively long (e.g. having a length of at least 100 m, for example at least 1 km), is durable and also capable to provide reproducible strain measurement results in measurement methods known per se (such as strain detection utilizing Brillouin scattering).

FIGS. 2-3 show an example of a method and system for manufacturing a strain sensor. The sensor may be an above-described strain sensor 1. In the resulting strain sensor 1, an outer diameter of the fiber 3 may be at least 250 µm, the cured filler material 4 may be one or more of a flexible and/or resilient material, and a material having a shore A hardness that is lower than about 50.

The manufacturing method of the sensor 1 includes: providing an optical fiber 3, at least including a fiber core 3a and a fiber cladding 3b; providing a preform 5a, for example an elongated strip, to be formed into a tubular protective encasing 5, feeding the optical fiber 3 to the preform 5a before and/or during the forming of the tubular encasing 5, to be enclosed in the encasing 5; providing a curable filler material 4a between the fiber 3 and an inner side of the encasing 5, and curing the curable filler material; wherein the cured filler material 4 allows strain coupling between the protective encasing 5 and the fiber 3 by connecting the fiber's and encasing's opposite surfaces to one-another. Particularly, the cured filler material 4 may lock the fiber 3 in place, allowing for the strain transfer to occur.

For carrying out this method, the respective system may include: a fiber supplier 103 for providing the optical fiber 3, a preform supplier 105 for supplying the preform 5a, and a filler material supplier 104, 104' for supplying the filler material. Also, the system may include an encasing forming structure 112 configured to form the encasing 5 from the respective preform 5a. The configuration may be such that during operation the optical fiber 3 is fed to the preform 5a before and/or during the forming of the tubular encasing 5. Also, the system can be configured such that the curable filler material 4a is supplied to the encasing preform 5a before, during and/or after the fiber 3 has been supplied to the encasing preform 5a.

The fiber 3 as such may e.g. be a fiber 3 as has been described above regarding FIG. 1. The curable filler material may be the curable material as has been described above regarding FIG. 1. The encasing 5, that is to be formed, may be an encasing as has been described above regarding FIG. 1.

The method may be a continuous process, wherein the forming of the tubular encasing 5 and the feeding of the optical fiber to the preform 5a are carried out in a continuous manner.

For example, the preform supply 105 of the respective system may be configured to continuously supply the preform 5a to the encasing forming structure 112. In a non limiting embodiment, to this aim, the preform supply 105 may include a rotating carrier 105, for carrying and unwinding the elongated preform 5a. One or more optional conveyors 111 (schematically depicted by dashed lines in FIG. 3) may be provided for transferring the preform 5a from its supplier 105, in a transport direction T, to the encasing forming structure 112, and for example for transferring a resulting formed encasing to further sections/stations 113, 114, 101 of the system. Alternatively, the system may be configured for pulling the preform 5a from the supply 105 to the encasing forming structure and beyond that structure (e.g. to further sections/stations 113, 114, 101), for example utilizing pulling means, e.g. capstans, endless gripper chains or differently.

Similarly, the fiber supply 103 of the respective system may be configured to continuously supply the fiber 3 to the preform 5a and the encasing forming structure 112. In a non limiting embodiment, to this aim, the fiber supply 103 may include a rotating carrier (not shown), for carrying and unwinding the fiber 3. The system may be configured for pulling the fiber 3 from the supply 103 to the encasing forming structure and beyond that structure (e.g. along or to further sections/stations 113, 114, 101), for example utilizing pulling means, e.g. capstans, endless gripper chains or differently.

The system may be configured for supplying the encasing perform 5a and the fiber 3 at substantially the same speed to the encasing forming structure 112. In an alternative embodiment, the preform 5a and fiber 3 may be supplied in mutually different speeds to the encasing forming structure 112. This may be, for example, in case the system includes an encasing drawings station 115 (see below) that longitudinally stretches the encasing 5 downstream with respect of the encasing forming structure 112. Then, the fiber 3 may be fed to the encasing forming structure 112 at a speed that matches a discharge speed of the drawn encasing 5 (i.e the speed of the encasing downstream with respect to the drawing station 115, which speed will be larger than the speed of the upstream perform 5a due to the drawing process).

The curable filler material 4a may be applied to the encasing's preform 5a before forming the encasing, and/or during the forming of the encasing, and/or to the tubular encasing after the encasing has been formed. FIGS. 2-3 schematically show a first filler material supply station 104 located upstream with respect to the encasing forming structure 112, for application of filler material onto the preform 5a. The supply station 104 may be configured in various ways, e.g. including a coater, sprayer or a different means for providing a predetermined supply of curable material 4a onto the preform 5a, preferably in a continuous manner during transfer of the preform 5a along that station 104. Additionally or alternatively, a supply station 104' for supplying the curable filler material may be integrated with the encasing forming structure 112, as will be appreciated by the skilled person.

The encasing forming structure 112 may be configured to continuously form a protective, tubular encasing 5 from the preform 5a, supplied thereto. Such a structure is known per se, as will be appreciated by the skilled person, and may for example be configured for carrying out a Fretz Moon process for forming welded tubes. Particularly, the encasing forming structure 112 may include forming rolls configured to bend the preform (e.g. a metal or steel strip) 5a with longitudinal sides inwards to form a tube.

The encasing forming structure 112 may e.g. be configured to deform a strip-like perform in one or more first steps to a generally U-type shape (viewed in cross-section) first, for receiving the fiber 3 and curable filler material 4a. Then, the encasing forming structure 112 may be configured to finish forming the encasing (e.g. by folding the U-type shape into a tubular shape) in one or more second steps, after the intermediate U-type shaped perform has received the fiber 3 and curable filler material 4a.

The tubular encasing may be longitudinally sealed, along a weld line 7, using a welding process. To this aim, the system may include one or more welding stations 113. FIGS. 2-3 show such a welding station being spaced-apart from the encasing forming structure 112. A said welding station can also be integrated with the encasing forming structure 112. A said welding stations 113 may be configured in various ways, e.g. including welding rolls or different welding means, as will be clear to the skilled person.

Also, during the manufacturing process, the resulting tubular encasing 5 may be hermetically sealed by the welding process, e.g. using a laser sealing technique. The resulting weld seam 7 may be subjected to a leak proof test, for example by means of eddy current.

Optionally, at least a section of the tubular encasing 5 may be deformed (e.g. downstream of the welding station) after having received the fiber and before curing of the curable filler material 4a in that section, for example in a drawing process for attaining a desired final diameter, final length, and/or a cold conversion for strength increase. The encasing deformation step may also lead to achieving a desired relatively small final transversal distance W between an inner side of the protective encasing and an outer side of the fiber 3.

The deformation of the encasing may e.g. include reducing the lateral size, in this example the diameter, of the tubular encasing 5, and e.g. longitudinally stretching the encasing 5. To this aim, the system can include one or more encasing drawing stations (one being schematically depicted by dashed lines) 114, located downstream of the encasing forming structure 112. Since the tubular encasing 5 is deformed before the curable filler material 4a in the respective section of the encasing has been cured, a local excessive straining of the respective fiber 3 (also present in the respective section of the encasing) may be reduced or avoided. In an embodiment, the drawing station 114 may e.g. be configured to reduce the encasing's initial external diameter to a desired final external diameter by at least 10%.

In a further embodiment, the deformation may include the reducing of the diameter of the tubular encasing 5, thereby removing any (usually air filled) voids that may be present in the encasing 5. For example, the manufacturing process may be such that the interior space of the encasing 5 may be not entirely filled by the fiber 3 and filler material 4, viewed in a transversal cross-section, after having left the forming structure 112 (and welding station 113). The empty (usually air filled) space that is then still present in the encasing 5 can be entirely removed in the diameter reduction step, so that the resulting reduced diameter section of the encasing is only filled with fiber 3 and curable filler material 4a. During the diameter reduction of the encasing 5, the uncured filler material 4a and fiber 3 may locally reposition to or towards a final position with respect to the encasing's inner side.

The method may also include coiling at least a section of the formed tubular encasing 5, for example after having received the optical fiber 3 and before the curable filler material 4a has been fully cured. To this aim, the system may include a winding station 101 for receiving and winding the resulting strain sensor 1, preferably in a continuous manner, for example onto a carrier such as a shipping reel.

As is schematically shown in the longitudinal cross-section FIG. 4A, the fiber 3 may extend substantially in parallel with a centre line of the tubular encasing 5 after the curable filler material 4a has been cured.

Alternatively, as has been shown in FIG. 4B, the fiber 3 may have some excess fiber length with respect to the length of the tubular encasing 5 after the curable material 4a has been cured, by including one or more bends, e.g. by having a wave-like shape. It has been found that this is particularly advantageous in the case that the cured filler material 4 is relatively soft and can act as a cushioning material.

Optionally, during manufacturing, the fiber 3 may be positioned in the protective encasing with one or more bends or in a wave-like shape, with respect to a centre line of the encasing (such as is shown in FIG. 4B). The fiber 3 may remain in such a shape during and after curing of the curable filler material 4a. Alternatively, the fiber 3 may be repositioned with respect from such a shape before curing of the curable filler material 4a, for example during an aforementioned tube deformation step (e.g. a said drawings step to reduce the diameter of the tubular encasing 5 towards a desired final external diameter, and optionally to reduce the distance W between the fiber and the encasing). In the repositioned condition, the fiber 3 may extend in parallel with a centre line of the encasing, or the fiber may have one or more bends to a lesser extent or may be in a wave-like shape to a lesser extent than a respective bending/fiber shape in the initial fiber condition.

EXAMPLE

A strain sensor having the configuration shown in FIG. 1 was made by the method described above. The sensor was tested in a Brillouin scattering experiment. In the particular example, the sensor included a flexible tubular encasing 5 made of stainless steel, welded along a longitudinal weld line, and having an outer diameter of 1.42 mm and an inner diameter of 1.12 mm.

The tested sensor further included a primary standard optical fiber having a core, cladding and a primary buffer layer 3c with external diameter of 250 micron, that was up-buffered with a secondary buffer layer 3d to an external diameter of 900 micron. Both buffer layers 3c, 3d of the tested sensor were made of acrylate. A 2-component curable silicon rubber gel filler material was applied for entirely filling the space between the resulting up-buffered fiber and the inner side of the encasing, and for mechanically connecting the fiber and encasing to allow strain coupling there-between (after curing of the filler material).

The resulting sensor was subjected to predetermined amounts of stress, applied to the stainless steel encasing, using a strain test bench, and the stress was measured using Brillouin scattering. It was found that highly reproducible Brillouin scattering strain measurements could be carried out with the tested sensor. A good linearity was found in measured strain and Brillouin reading of strain. Also, it was found that the fiber 3 did not experience any significant lock-in strain (i.e. strain acting on the fiber 3 when the encasing 5 is not experiencing any outside strain).

Thus, the resulting sensor 1 can be used as a distributed strain sensor, with sufficient strain transfer from the tubular encasing 5 to the fiber 3 and limited or no lock-in strain.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. Strain sensor, including an elongated protective encasing surrounding an inner space, and an optical fiber extending through the encasing, the fiber at least including a fiber core, a fiber cladding and a coating, wherein a cured filler material fills at least part of a space between the fiber and the protective encasing, the cured filler material being configured for allowing strain coupling between the protective encasing and the fiber, wherein an outer diameter of the fiber is at least about 250 μm, the cured filler material is one or more of: a flexible material, a resilient material, and a material having a shore A hardness that is lower than about 50, and wherein a maximum transversal distance between an inner side of the protective encasing and an outer side of the fiber is in the range of 40 μm to 200 μm.

2. Strain sensor according to claim 1, wherein at least a section of the tubular encasing has been coiled.

3. Strain sensor according to claim 1, wherein the fiber has some excess fiber length with respect to a length of the tubular encasing.

4. Strain sensor according to claim 1, wherein the cured filler material is selected from the group consisting of: a polymer or polymeric material, a rubber or rubberlike material, a silicone, a thermoplastic material, and a cured gel.

5. Strain sensor according to claim 1, wherein an outer diameter of the fiber is at least 300 μm.

6. Strain sensor according to claim 1, wherein the fiber includes at least one buffer layer extending around the coating, the at least one buffer layer providing said outer diameter of the fiber.

7. Strain sensor according to claim 1, wherein a minimum transversal distance between an inner side of the protective encasing and an outer side of the fiber is 0 μm.

8. Strain sensor according to claim 1, wherein an inner side of the protective encasing has a substantially circular cross-section.

9. Strain sensor according to claim 1, wherein the protective encasing is made of, or substantially consists of, at least one metal or an alloy, or steel.

10. Strain sensor according to claim 1, wherein the protective encasing has a wall thickness that is smaller than about 0.5 mm.

11. A method for manufacturing a strain sensor, the method including:
providing an optical fiber, at least including a fiber core, a fiber cladding and a fiber coating;
providing a preform to be formed into a tubular protective encasing;
feeding the optical fiber to the preform before and/or during the forming of the tubular encasing, to be enclosed in the encasing
providing a curable filler material between the fiber and an inner side of the encasing, and curing the curable filler material;
wherein the cured filler material allows strain coupling between the protective encasing and the fiber by connecting the fiber's and encasing's opposite surfaces to one-another.

12. A method according to claim 11, wherein the forming of the tubular encasing and the feeding of the optical fiber to the preform are carried out in a continuous process.

13. A method according to claim 11, wherein the curable filler material is applied to the preform before forming the encasing, and/or during the forming of the encasing, and/or to the tubular encasing after the encasing has been formed.

14. A method according to claim 11, wherein the tubular encasing is longitudinally sealed using a welding process.

15. A method according to claim 11, wherein at least a section of the tubular encasing is deformed after having received the fiber and before curing of the curable filler material in that section.

16. A method according to claim 11, including coiling at least a section of the formed tubular encasing.

17. A method according to claim 11, wherein an outer diameter of the fiber is at least about 250 μm, wherein the cured filler material is selected from the group consisting of: a flexible material, a resilient material, a material having a shore A hardness that is lower than about 50, and a resilient material having a shore A hardness that is lower than about 50.

18. A method according to claim 11, wherein the fiber is repositioned in the protective encasing before the curing of the curable material.

19. A system configured for carrying out a method that includes at least the steps of
providing an optical fiber, at least including a fiber core, a fiber cladding and a fiber coating;
providing a perform, to be formed into a tubular protective encasing,
feeding the optical fiber to the perform before and/or during the forming of the tubular encasing, to be enclosed in the encasing;
providing a curable filler material between the fiber and an inner side of the encasing, and curing the curable filler material;
wherein the cured filler material allows strain coupling between the protective encasing and the fiber by connecting the fiber's and encasing's opposite surfaces to one-another, wherein the system includes:
a fiber supplier for providing the optical fiber;
a preform supplier for supplying the preform;
a filler material supplier for supplying the filler material; and
an encasing former configured to form the encasing from the respective preform.

20. The system according to claim 19, including a station located downstream of the encasing former for stretching the formed encasing.

21. The system according to claim 20, wherein the system is configured to supply the fiber with a first speed to the encasing former, wherein the system is configured to supply the perform with a second speed to encasing former, wherein the first speed is higher than the second speed.

22. A system configured for manufacturing a strain sensor, the system including:
a fiber supplier for providing an optical fiber;
a perform supplier for supplying a perform, to be formed into a tubular protective encasing;
a filler material supplier for supplying a filler material; and
an encasing former configured to form the encasing from the respective perform.

23. A method according to claim 16, including coiling at least a section of the formed tubular encasing after having received the optical fiber and before the curable filler material has been fully cured.

24. Strain sensor, including an elongated protective encasing (5) surrounding an inner space, and an optical fiber (3) extending through the encasing (5), the fiber (3) at least including a fiber core (3a), a fiber cladding (3b) and a coating (3c), wherein a cured filler material fills (4) at least part of a space between the fiber (3) and the protective encasing (5), the protective encasing having a wall thickness that is smaller than about 0.5 mm,
the cured filler material (4) being configured for allowing strain coupling between the protective encasing (5) and the fiber (3), wherein an outer diameter of the fiber (3) is at least about 300 μm, a maximum transversal distance between an inner side of the protective encasing and an outer side of the fiber is in the range of 40 μm to 200 μm, and the cured filler material (4) is one or more of: a flexible material, a resilient material, and a material having a shore A hardness that is lower than about 50, for example a shore A hardness in the range of about 5 to 40, for example the range of between 10 and 30, and wherein a maximum transversal distance between an inner side of the protective encasing and an outer side of the fiber is in the range of 40 μm to 200 μm.

* * * * *